United States Patent
Ma et al.

(10) Patent No.: US 11,742,515 B2
(45) Date of Patent: Aug. 29, 2023

(54) SOLID ELECTROLYTE, PREPARATION METHOD THEREOF, LITHIUM-AIR BATTERY INCLUDING THE SOLID ELECTROLYTE, AND ELECTROCHEMICAL DEVICE INCLUDING THE SOLID ELECTROLYTE

(71) Applicant: Samsung Electronics Co., Ltd., Suwon-si (KR)

(72) Inventors: Sangbok Ma, Suwon-si (KR); Donghwa Seo, Burlington, MA (US); Hyunpyo Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 253 days.

(21) Appl. No.: 17/030,571

(22) Filed: Sep. 24, 2020

(65) Prior Publication Data
US 2021/0098821 A1    Apr. 1, 2021

Related U.S. Application Data

(60) Provisional application No. 62/906,297, filed on Sep. 26, 2019.

(30) Foreign Application Priority Data
Feb. 25, 2020    (KR) .................. 10-2020-0023004

(51) Int. Cl.
*H01M 10/0562*    (2010.01)
*H01M 12/08*    (2006.01)

(52) U.S. Cl.
CPC ....... *H01M 10/0562* (2013.01); *H01M 12/08* (2013.01); *H01M 2300/008* (2013.01)

(58) Field of Classification Search
CPC ............ H01M 10/0562; H01M 12/08; H01M 2300/008
See application file for complete search history.

(56) References Cited

U.S. PATENT DOCUMENTS

2004/0013943 A1* 1/2004 Stoker ................. H01M 4/5825
                                                        429/231.95
2019/0185337 A1    6/2019 Katoh
(Continued)

FOREIGN PATENT DOCUMENTS

CN        105070944 A      11/2015
WO    WO-2017147793 A1 *  9/2017 ............ H01M 12/08
(Continued)

OTHER PUBLICATIONS

English machine translation of Li et al. (CN 105070944 A). (Year: 2015).*

(Continued)

*Primary Examiner* — Brian R Ohara
*Assistant Examiner* — Aaron J Salter
(74) *Attorney, Agent, or Firm* — Cantor Colburn LLP

(57) ABSTRACT

A solid electrolyte including: a compound represented by Formula 1, $$Li_xM1_{2-y}M2_y(PO_{4-z}X_z)_3 \quad \text{Formula 1}$$

wherein, in Formula 1, M1 is a tetravalent element, M2 is a monovalent element, a divalent element, a trivalent element, a tetravalent element, a pentavalent element, a hexavalent element, or a combination thereof, X is a halogen atom, a pseudohalogen, or a combination thereof, $0<x<8$, $0\leq y<1$, and $0<z<4$.

23 Claims, 4 Drawing Sheets

(56) References Cited

U.S. PATENT DOCUMENTS

2019/0229369 A1    7/2019  Katoh et al.
2020/0020976 A1*  1/2020  Isomichi ............. H01M 10/052

FOREIGN PATENT DOCUMENTS

| WO | 2018077433 A1 | 5/2018 |
| WO | 2018077434 A1 | 5/2018 |
| WO | 2018181674 A1 | 10/2018 |

OTHER PUBLICATIONS

English machine translation of Jin et al. (WO 2017147793 A1) (Year: 2017).*
European Search Report for European Patent Application No. 20197641.2 dated Mar. 10, 2021.
Yang et al., "Rechargeable solid-state Li-air batteries: a status report", Rare Metals, 2018, 37(6), 459-472.

* cited by examiner

SOLID ELECTROLYTE, PREPARATION METHOD THEREOF, LITHIUM-AIR BATTERY INCLUDING THE SOLID ELECTROLYTE, AND ELECTROCHEMICAL DEVICE INCLUDING THE SOLID ELECTROLYTE

CROSS-REFERENCE TO RELATED APPLICATION

This application claims priority to and the benefit of U.S. Provisional Patent Application No. 62/906,207, filed on Sep. 26, 2019, in the US Patent and Trademark Office, and Korean Patent Application No. 10-2020-0023004, filed on Feb. 25, 2020, in the Korean Intellectual Property Office, and all the benefits accruing therefrom under 35 U.S.C. § 119, the contents of which are incorporated herein in their entirety by reference.

BACKGROUND

1. Field

The present disclosure relates to a solid electrolyte, a method of preparing the solid electrolyte, and a lithium-air battery and an electrochemical device each including the solid electrolyte.

2. Description of Related Art

In a lithium-air battery, lithium metal is used as the anode active material, and it is unnecessary to store air as a cathode active material in the battery, and thus, a lithium-air battery may be implemented as a high-capacity battery. In addition, lithium-air batteries have a high theoretical specific energy of 3,500 Watt hours/kilogram (Wh/kg), or greater.

The stability of the solid electrolyte of a lithium-air battery against lithium hydroxide, which is a discharge product of the lithium-air battery, is not satisfactory, and the ionic conductivity under strongly basic conditions, like in lithium hydroxide, is reduced relative to in an acid, for example. Therefore, there is a need for improved battery materials.

SUMMARY

Provided are a solid electrolyte, which is stable against a strong base and moisture, and a method of preparing the solid electrolyte.

Provided is a lithium-air battery including the solid electrolyte.

Provided is an electrochemical device including the solid electrolyte.

Additional aspects will be set forth in part in the description which follows and, in part, will be apparent from the description, or may be learned by practice of the presented embodiments of the disclosure.

According to an aspect, there is provided a solid electrolyte including: a compound presented by Formula 1

Formula 1 wherein, in Formula 1, M1 is a tetravalent element, M2 is a monovalent element, a divalent element, a trivalent element, a tetravalent element, a pentavalent element, a hexavalent element, or a combination thereof, X is a halogen atom, a pseudohalogen, or a combination thereof, $0<x<8$, $0\le y<1$, and $0<z<4$.

According to another aspect, there is provided a lithium-air battery including: a cathode; an anode; and an electrolyte disposed between the cathode and the anode, the electrolyte including the solid electrolyte.

In an embodiment, at least one of the cathode and the anode may include the solid electrolyte including a compound of Formula 1.

According to another aspect, there is provided an electrochemical device including the solid electrolyte.

In an embodiment, the electrochemical device may include a battery, an accumulator, a supercapacitor, a fuel cell, a sensor, an electrochromic device, or a combination thereof.

According to another aspect, there is provided a method of preparing a solid electrolyte, the method including: providing a lithium precursor, an M1 precursor, an X precursor, and a phosphorous precursor to prepare a precursor mixture; and thermally treating the precursor mixture to prepare a solid electrolyte comprising a compound represented by Formula 1

Formula 1 wherein, in Formula 1, M1 is a tetravalent element, M2 is a monovalent element, a divalent element, a trivalent element, a tetravalent element, a pentavalent element, hexavalent element, or a combination thereof, X is a halogen atom, a pseudohalogen, or a combination thereof, $0<x<8$, $0\le y<1$, and $0<z<4$.

In an embodiment, in the preparing of the precursor mixture, a M2 precursor may be further added.

Also disclosed is a solid electrolyte including: a compound represented by Formula 1

Formula 1 wherein, in Formula 1, M1 is a tetravalent element, M2 is a trivalent element, X is a halogen atom, $0<x<8$, $0\le y<0.1$, and $0<z<0.2$.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a solid electrolyte, a method of preparing the solid electrolyte, a lithium-air battery including the solid electrolyte, and an electrochemical device including the solid electrolyte will be described in detail.

According to an aspect, there is provided a solid electrolyte including a compound represented by Formula 1.

$$Li_xM1_{2-y}M2y(PO_{4-z}X_z)_3 \quad \text{Formula 1}$$

In Formula 1, M1 may be a tetravalent element, M2 is a monovalent element, a divalent element, a trivalent element, a tetravalent element, a pentavalent element, a hexavalent element, or a combination thereof, and X is a halogen atom, a pseudohalogen, or a combination thereof, $0<x<8$, $0\leq y<1$, and $0<z<4$.

In Formula 1, the element may be a cationic element.

In Formula 1, for example, when M2 is a trivalent element, x may be equal to $1+y-3z$. When this condition is satisfied, the solid electrolyte including the compound of Formula 1, may satisfy charge balance and be in neutral state.

A solid electrolyte of a lithium-air batteries is desirably reversibly stable to any changes that may occur under humid conditions or in air. To this end, stability against lithium hydroxide (LiOH), which is a discharge product, and moisture is desired. However, existing solid electrolytes have low stability against moisture and strong bases such as lithium hydroxide, and thus have very low conductivity. Accordingly, there is an increasing need for a solid electrolyte having improved properties.

Disclosed is a solid electrolyte which maintains good ionic conductivity, even after exposure to a strong base such as lithium hydroxide, and maintains good ionic conductivity after exposure to moisture. The solid electrolyte may be obtained by introducing anions from a halogen atom, a pseudohalogen, or a combination thereof, into a phosphate-based electrolyte.

Since the solid electrolyte contains the compound of Formula 1, into which anions are introduced, the solid electrolyte may have improved phase stability. In particular, the solid electrolyte may have good stability under a strong basic conditions, for example, at a pH of about 12 to about 13, and thus can maintain good ionic conductivity.

In Formula 1, M1 may be a tetravalent cationic element, for example, hafnium (Hf), titanium (Ti), zirconium (Zr), or a combination thereof.

M2 may substitute for M1 on some sites of M1 in a crystal structure of the compound. M2 may be, for example, a divalent, a trivalent, or a tetravalent cationic element, for example, aluminum (Al), lanthanum (La), scandium (Sc), cerium (Ce), praseodymium (Pr), gadolinium (Gd), europium (Eu), or a combination thereof. Aluminum (Al), lanthanum (La), scandium (Sc), and gadolinium (Gd) are all trivalent cationic elements, and cerium (Ce) and praseodymium (Pr) may be trivalent or tetravalent elements, and europium (Eu) may be a divalent or a trivalent element.

While not wanting to be bound by theory, it is understood that the disclosed M2 elements have a large lattice volume, and that the lithium ion conductivity of the solid electrolyte may be further improved by including M2, as compared with a solid electrolyte into which M2 is not introduced.

X may be, as described above, a halogen atom, a pseudohalogen, or a combination thereof.

As used herein, the term "pseudohalogen" is a molecule comprising, e.g., consisting of, two or more electronegative atoms like halogens that in the free state generate anions similar to halide ions. Examples of pseudohalogens are a cyanide (CN), a cyanate (OCN), a thiocyanate (SCN), an azide ($N_3$), or a combination thereof.

X may be, for example, at least one halogen atom, for example, two halogen atoms, and may substitute oxygen and may reside on an oxygen sites in a crystal structure of the compound of Formula 1.

For example, X may be chlorine (C), bromine (Br), fluorine (F), a cyanide, a cyanate, a thiocyanate, an azide, or a combination thereof.

For example, $X_{3z}$ may be $F_n$, $Br_n$, $Cl_n$, $(F_aCl_{1-a})_n$, $(F_aBr_{1-a})_n$, or $(Cl_aBr_{1-a})_n$, wherein n may be 1 or smaller, for example, about 0.1 to about 0.9, for example, about 0.1 to about 0.5, for example, about 0.1 to about 0.3, for example, about 0.1 to about 0.2. Also, a may be about 0.01 to about 0.99, for example, about 0.2 to about 0.8, about 0.3 to about 0.7, for example, about 0.5.

In Formula 1, x may be about 0.5 to about 1.5, for example, about 0.7 to about 1.3, for example, about 0.8 to about 1.2. In Formula 1, y may be 0 to about 0.8, for example, 0 to about 0.5, for example, about 0.05 to about 0.5, for example, about 0.1 to about 0.3. In Formula 1, when y is 0 or greater and M2 is present, and while not wanting to be bound by theory, it is understood that because the lattice volume of M2 may be greater than the lattice volume of M1, when a compound containing M1 and M2 is used, a solid electrolyte having further improved ionic conductivity may be prepared as compared to when M2 is not present in the compound, e.g., when a compound containing only M1 is used.

In Formula 1, z may be greater than 0 to about 1, for example, about 0.01 to about 0.8, for example, about 0.02 to about 0.7, for example, about 0.03 to about 0.5, for example, about 0.05 to about 0.2.

In an embodiment, the solid electrolyte may have a phase with a NASICON crystal structure or a crystal structure that is isostructural with the NASICON crystal structure. NASICON is a compound of the general formula $A_1Q_2(PO_4)_3$ where A is a monovalent cation and Q is either a single or combination of tri, tetra, or penta valent ion. The characteristics of these structures may be identified through X-ray diffraction (XRD) analysis. In an embodiment, the solid electrolyte including the compound of Formula 1 may exhibit peaks at a diffraction angle (2θ) of 14.1°±0.5°, 19.9°±0.5°, 20.2° 0.5°, 23.5°±0.5°, 28.5°±0.5°, 31.7°±0.5°, or 35.2°±0.5°, in an XRD spectrum, e.g., when analyzed by X-ray diffraction spectroscopy using CuKα radiation.

The solid electrolyte including the compound of Formula 1 may exhibit shifted X-ray diffraction peak characteristics, as compared to those of a solid electrolyte including the compound of Formula 1 (wherein z=0). From such shifted X-ray diffraction peak characteristics, it may be understood that X substitutes for some oxygen in the compound. For example, the X may substitute for oxygen and reside on an oxygen crystallographic site.

In an embodiment, the compound of Formula 1 may exhibit two diffraction peaks at a diffraction angle (2θ) of about 19.8°2θ to about 20.4°2θ in the XRD spectra thereof. The two diffraction peaks may include a first diffraction peak and a second diffraction peak. The first diffraction peak may have a maximum point at a diffraction angle (2θ) of about 19.93°2θ to about 19.99°2θ, and the second diffraction peak may have a maximum point at a diffraction angle (2θ) of about 20.17°2θ to about 20.25°2θ. For example, The first diffraction peak may have a maximum point at a diffraction angle (2θ) of about 19.95°2θ to about 19.97°2θ, and the second diffraction peak may have a maximum point at a diffraction angle (2θ) of about 20.19°2θ to about 20.23°2θ or about 20.20°2θ to about 20.22°2θ.

While not wanting to be bound by theory, it is understood that the first diffraction peak is related to, for example, the (104) crystal plane of the solid electrolyte including compound of Formula 1, and the second diffraction peak is related to, for example, the (110) crystal plane thereof. The height of the second diffraction peak may be in a range of about 72% to about 99%, for example, about 75% to about 82%, for example, about 77% to about 81%, of the height of the first diffraction peak. A ratio of an intensity of the second diffraction peak (P2) to an intensity of the first diffraction peak (P1) may be less than about 1, about 0.1 to less than about 1, about 0.6 to less than about 1, or about 0.77 to about 0.81.

The first diffraction peak may have a half width of about 0.7° 2θ to about 1.3°2θ and the second diffraction peak may have a half width of about 0.7°2θ to about 1.3°2θ.

In an embodiment, the solid electrolyte including the compound of Formula 1 may exhibit two peaks at a diffraction angle (2θ) of about 19.8°2θ to about 20.4°2θ in the XRD spectra thereof. The two diffraction peaks may include a first diffraction peak and a second diffraction peak. The first diffraction peak may have a maximum at a diffraction angle (2θ) of about 19.93°2θ to about 19.99°2θ, and the second diffraction peak may have a doublet peak shape.

The second diffraction peak having a doublet peak shape may include a second diffraction peak P2 with a first maximum point at a diffraction angle (2θ) of about 20.15° 2θ to about 20.25° 2θ, and a second diffraction peak P3 with a second maximum point at a diffraction angle (2θ) of about 20.26°2θ to about 20.32°2θ. For example, a second diffraction peak P2 with the first maximum point at a diffraction angle (2θ) of about 20.16° 2θ to about 20.24° 2θ, about 20.17° 2θ to about 20.20° 2θ, or about 20.17° 2θ to about 20.18° 2θ, and a second diffraction peak P3 with a second maximum point at a diffraction angle (2θ) of about 20.28°2θ to about 20.31°2θ, or about 20.29° 2θ to about 20.30° 2θ. The first diffraction peak may have a half width of about 0.7°2θ to about 1.3°2θ, and the second diffraction peak may have a half width of about 0.7°2θ to about 1.3°2θ.

In an embodiment, in the X-ray diffraction spectra of the solid electrolyte, an intensity ratio of the second diffraction peak P2 to the first diffraction peak may be greater than 1, and an intensity ratio of the second diffraction peak P3 to the first diffraction peak may be greater than 1. The X-ray diffraction can be performed with CuKα radiation.

Figure 2:
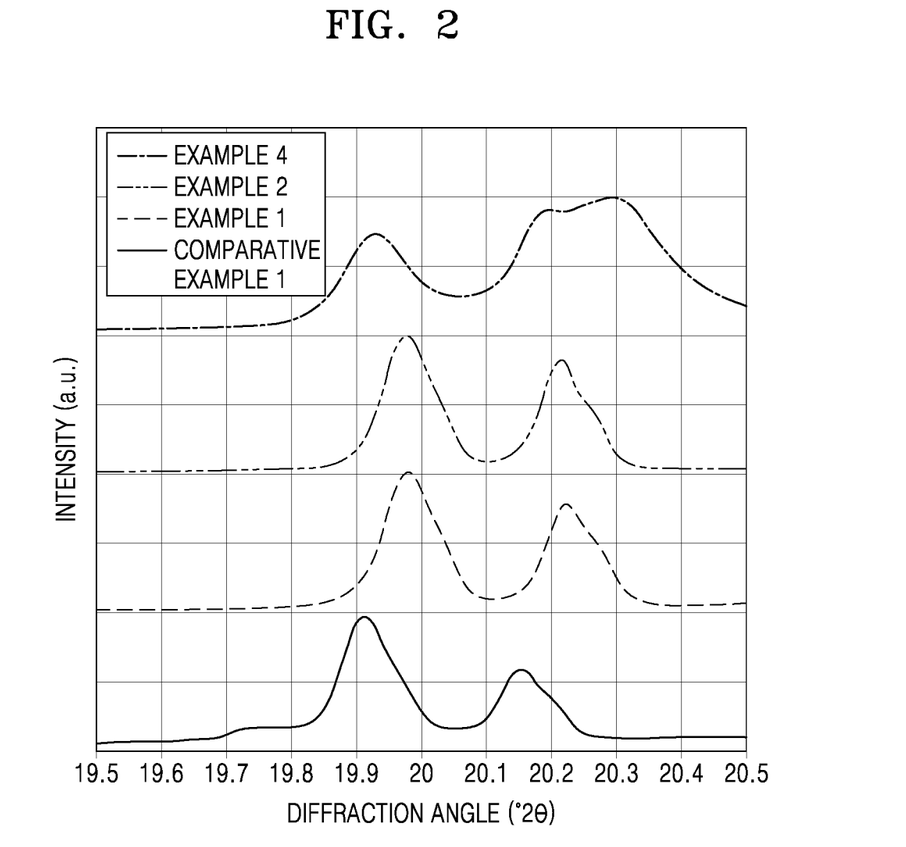
FIG. 2 is an enlarged view of portions of the graph shown in FIG. 1.

The second diffraction peak may have a doublet peak shape, as illustrated in FIG. 2, including a second diffraction peak A1 with a first maximum point, and a second diffraction peak A2 with a second maximum point.

While not wanting to be bound by theory, it is understood that the first diffraction peak is related to, for example, the (104) crystal plane of the solid electrolyte including compound of Formula 1, and the second diffraction peak with a first maximum point is related to, for example, the (110) crystal plane thereof. The second diffraction peak with a second maximum point is related with, for example, the (210) crystal plane of the solid electrolyte including the compound of Formula 1. The height of the second diffraction peak P2 with a first maximum point at a 2θ of about 20.15° 2θ to about 20.25° 2θ, and the height of the second diffraction peak P3 with a second maximum point at a 2θ of about 20.26° 2θ to about 20.32° 2θ may both exceed 100% of the height of the first diffraction peak. An intensity ratio (P2/P1) of the second diffraction peak P2 to the first diffraction peak P1, and an intensity ratio (P3/P1) of the second diffraction peak P3 to the first diffraction peak P1 may both be greater than 1, for example, each independently greater than 1 to about 2, greater than 1 to about 1.5, or greater than 1 to about 1.26.

The first diffraction peak may have a half width of about 0.7°2θ to about 1.3°2θ, the second diffraction peak P2 with a first maximum point may have a half width of about 0.7°2θ to about 1.3°2θ, and the second diffraction peak P3 with a second maximum point may have a half width of about 0.7°2θ to about 1.3°2θ.

The compound represented by Formula 1 may be a compound represented by Formula 2, a compound represented by Formula 3, or a compound represented by Formula 4.

$$Li_{1+y-3z}Hf_{2-y}M2y(PO_{4-z}X_z)_3 \quad \text{Formula 2}$$

In Formula 2,
M2 may a monovalent element, a divalent element, a trivalent element, a tetravalent element, a pentavalent element, a hexavalent element, or a combination thereof,
X may be a halogen atom, a pseudohalogen, or a combination thereof,
0≤y<1, and 0<z<4.

$$Li_{1+y-3z}Ti_{2-y}M2y(PO_{4-z}X_z)_3 \quad \text{Formula 3}$$

In Formula 3,
M2 may be a monovalent element, a divalent element, a trivalent element, a tetravalent element, a pentavalent element, a hexavalent element, or a combination thereof,
X may be a halogen atom, a pseudohalogen, or a combination thereof,
0≤y<1, and 0<z<4.

$$Li_{1+y-3z}Zr_{2-y}M2y(PO_{4-z}X_z)_3 \quad \text{Formula 4}$$

In Formula 4,
M2 may be a monovalent element, a divalent element, a trivalent element, tetravalent element, a pentavalent element, a hexavalent element, or a combination thereof,
X may be a halogen atom, a pseudohalogen, or a combination thereof,
0≤y<1, and 0<z<4.
In Formulae 2 to 4, 1+y−3z may be about 0.5 to about 1.5, y may be 0 or greater than 0 to about 0.8, and z may be greater than 0 to about 1.

In the solid electrolyte, the compound represented by Formula 1 may be, for example, $Li_{0.8}Hf_2P_3O_{11.8}F_{0.2}$, $Li_{0.8}Hf_2P_3O_{11.8}Cl_{0.2}$, $LiHf_{1.9}Y_{0.1}P_3O_{11.9}F_{0.1}$, $LiHf_{1.9}Y_{0.1}$ $P_3O_{11.9}Cl_{0.1}$, $Li_{0.8}Hf_2P_3O_{11.8}Br_{0.2}$, $Li_{0.8}Hf_2P_3O_{11.8}Br_{0.1}F_{0.1}$, $Li_{0.8}Hf_2P_3O_{11.8}Br_{0.1}Cl_{0.1}$, $LiHf_{1.9}Y_{0.1}P_3O_{11.9}Br_{0.1}$, $LiHf_{1.9}Y_{0.1}P_3O_{11.9}Br_{0.05}F_{0.05}$, $LiHf_{1.9}Y_{0.1}P_3O_{11.9}Br_{0.05}Cl_{0.05}$, $Li_{0.8}Ti_2P_3O_{11.8}F_{0.2}$, $Li_{0.8}Ti_2P_3O_{11.8}Cl_{0.2}$, $LiTi_{1.9}Y_{0.1}P_3O_{11.9}F_{0.1}$, $LiTi_{1.9}Y_{0.1}P_3O_{11.9}Cl_{0.1}$, $Li_{0.8}Ti_2P_3O_{11.8}Br_{0.2}$, $Li_{0.8}Ti_2P_3O_{11.8}Cl_{0.2}$, $LiTi_{1.9}Y_{0.1}P_3O_{11.9}F_{0.1}$, $LiTi_{1.9}Y_{0.1}P_3O_{11.9}Cl_{0.1}$, $Li_{0.8}Ti_2P_3O_{11.8}Br_{0.1}F_{0.1}$, $Li_{0.8}Ti_2P_3O_{11.8}Br_{0.1}Cl_{0.1}$, $LiTi_{1.9}Y_{0.1}P_3O_{11.9}Br_{0.1}$, $LiTi_{1.9}Y_{0.1}P_3O_{11.9}Br_{0.05}F_{0.05}$, $LiTi_{1.9}Y_{0.1}P_3O_{11.9}Br_{0.05}Cl_{0.05}$, $Li_{0.8}Zr_2P_3O_{11.8}F_{0.2}$, $Li_{0.8}Zr_2P_3O_{11.8}Cl_{0.2}$, $LiZr_{1.9}Y_{0.1}P_3O_{11.9}F_{0.1}$, $LiZr_{1.9}Y_{0.1}P_3O_{11.9}Cl_{0.1}$, $Li_{0.8}Zr_2P_3O_{11.8}Br_{0.2}$, $Li_{0.8}Zr_2P_3O_{11.8}Cl_{0.2}$, $LiZr_{1.9}Y_{0.1}P_3O_{11.9}F_{0.1}$, $LiZr_{1.9}Y_{0.1}P_3O_{11.9}Cl_{0.1}$, $Li_{0.8}Zr_2P_3O_{11.8}Br_{0.1}F_{0.1}$, $Li_{0.8}Zr_2P_3O_{11.8}Br_{0.1}Cl_{0.1}$, $LiZr_{1.9}Y_{0.1}P_3O_{11.9}Br_{0.1}$, $LiZr_{1.9}Y_{0.1}P_3O_{11.9}Br_{0.05}F_{0.05}$, $LiZr_{1.9}Y_{0.1}P_3O_{11.9}Br_{0.05}Cl_{0.05}$, $LiHf_{1.9}Al_{0.1}P_3O_{11.9}F_{0.1}$, $LiHf_{1.9}Al_{0.1}P_3O_{11.9}Br_{0.1}$, $LiHf_{1.9}Al_{0.1}P_3O_{11.9}F_{0.5}Br_{0.05}$, $LiHf_{1.9}Al_{0.1}P_3O_{11.9}Cl_{0.1}$, $LiHf_{1.9}Al_{0.1}P_3O_{11.9}Cl_{0.05}Br_{0.05}$, $LiHf_{1.9}La_{0.1}P_3O_{11.9}F_{0.1}$, $LiHf_{1.9}La_{0.1}P_3O_{11.9}Br_{0.1}$, $LiHf_{1.9}La_{0.1}P_3O_{11.9}F_{0.05}Br_{0.05}$, $LiHf_{1.9}La_{0.1}P_3O_{11.9}Cl_{0.05}Br_{0.05}$, $LiHf_{1.9}La_{0.1}P_3O_{11.9}Cl_{0.1}$, $LiHf_{1.9}Gd_{0.1}P_3O_{11.9}F_{0.1}$, $LiHf_{1.9}Gd_{0.1}P_3O_{11.9}F_{0.05}Br_{0.05}$, $LiHf_{1.9}Gd_{0.1}P_3O_{11.9}Cl_{0.05}Br_{0.05}$, $LiHf_{1.9}Gd_{0.1}P_3O_{11.9}Cl_{0.1}$, $LiZr_{1.9}Al_{0.1}P_3O_{11.9}F_{0.1}$, $LiHf_{1.9}Al_{0.1}P_3O_{11.9}F_{0.05}Br_{0.05}$, $LiHf_{1.9}Al_{0.1}P_3O_{11.9}Cl_{0.05}Br_{0.05}$, $LiZr_{1.9}Al_{0.1}P_3O_{11.9}Cl_{0.1}$, $LiZr_{1.9}La_{0.1}P_3O_{11.9}F_{0.1}$, $LiZr_{1.9}La_{0.1}P_3O_{11.9}Br_{0.1}$, $LiZr_{1.9}La_{0.1}P_3O_{11.9}Br_{0.05}F_{0.05}$, $LiZr_{1.9}La_{0.1}P_3O_{11.9}Br_{0.05}Cl_{0.05}$, $LiZr_{1.9}La_{0.1}P_3O_{11.9}Cl_{0.1}$, $LiZr_{1.9}Gd_{0.1}P_3O_{11.9}F_{0.1}$, $LiZr_{1.9}Gd_{0.1}P_3O_{11.9}Br_{0.1}$, $LiZr_{1.9}Gd_{0.1}P_3O_{11.9}Br_{0.05}F_{0.05}$, $LiZr_{1.9}Gd_{0.1}P_3O_{11.9}Br_{0.05}Cl_{0.05}$, $LiZr_{1.9}Gd_{0.1}P_3O_{11.9}Cl_{0.1}$, $LiTi_{1.9}Al_{0.1}P_3O_{11.9}F_{0.1}$, $LiTi_{1.9}Gd_{0.1}P_3O_{11.9}Br_{0.1}$, $LiTi_{1.9}Gd_{0.1}P_3O_{11.9}Br_{0.05}F_{0.05}$, $LiTi_{1.9}Gd_{0.1}P_3O_{11.9}Br_{0.05}Cl_{0.05}$, $LiTi_{1.9}Al_{0.1}P_3O_{11.9}Cl_{0.1}$, $LiTi_{1.9}La_{0.1}P_3O_{11.9}F_{0.1}$, $LiTi_{1.9}La_{0.1}P_3O_{11.9}Cl_{0.1}$, $LiTi_{1.9}Gd_{0.1}P_3O_{11.9}F_{0.1}$, $LiTi_{1.9}Gd_{0.1}P_3O_{11.9}Br_{0.1}$, $LiTi_{1.9}Gd_{0.1}P_3O_{11.9}Br_{0.05}F_{0.05}$, $LiTi_{1.9}Gd_{0.1}P_3O_{11.9}Br_{0.05}Cl_{0.05}$, $LiTi_{1.9}Gd_{0.1}P_3O_{11.9}Cl_{0.1}$, $Li_{0.8}Hf_2P_3O_{11.8}F_{0.1}Cl_{0.1}$, $LiHf_{1.9}Y_{0.1}P_3O_{11.9}F_{0.05}Cl_{0.05}$, $Li_{0.8}Ti_2P_3O_{11.8}F_{0.1}Cl_{0.1}$, $LiTi_{1.9}Y_{0.1}P_3O_{11.9}F_{0.05}Cl_{0.05}$, $Li_{0.8}Zr_2P_3O_{11.8}F_{0.1}Cl_{0.1}$, $LiZr_{1.9}Y_{0.1}P_3O_{11.9}F_{0.05}Cl_{0.05}$, or a combination thereof.

In an embodiment, the solid electrolyte may have an ionic conductivity, for example, of about $1\times10^{-5}$ Siemens per centimeter (S/cm) or greater, for example, about $1.4\times10^{-5}$ S/cm or greater, about $2\times10^{-5}$ S/cm or greater, about $3\times10^{-5}$ S/cm or greater, or about $5\times10^{-5}$ S/cm or greater, e.g., about $1\times10^{-5}$ S/cm to about $1\times10^{-3}$ S/cm, about $5\times10^{-5}$ S/cm to about $5\times10^{-4}$ S/cm, about $1\times10^{-5}$ S/cm to about $1\times10^{-4}$ S/cm, after being impregnated with a saturated lithium hydroxide (LiOH) solution, and thus may maintain the ionic conductivity even after exposure to a strong base. From this, it is understood that the solid electrolyte according to an embodiment may have excellent stability against a strong base.

As used herein, the term "ionic conductivity after impregnation with a saturated lithium hydroxide (LiOH) solution" indicates an ionic conductivity of the solid electrolyte after the solid electrolyte is impregnated with a saturated lithium hydroxide solution and then maintained at 40° C. for 6 days or 7 days.

In an embodiment, the solid electrolyte may have an ionic conductivity retention of about 50% or greater, for example, about 56% or greater, for example, about 95% or greater, for example, about 100% or greater, for example, about 150% or greater, for example, about 220% or greater, e.g., about 50% to about 400%, about 100% to about 350%, or about 100% to about 300%, in a saturated lithium hydroxide (LiOH) solution, e.g., after 6 days or 7 days at 40° C.

Throughout the specification, the "ionic conductivity retention with respect to saturated lithium hydroxide (LiOH) solution" may be calculated using Equation 1.

(Ionic conductivity after electrolyte is impregnated with saturated lithium hydroxide solution)/ (Ionic conductivity before electrolyte is impregnated with saturated lithium hydroxide solution)×100%    Equation 1

In an embodiment, the solid electrolyte may have an ionic conductivity at 25° C. of, for example, about $1\times10^{-6}$ Siemens per centimeter (S/cm) or greater, for example, about $1\times10^{-5}$ S/cm or greater, for example, about $3\times10^{-5}$ S/cm or greater, e.g., about $1\times10^{-6}$ S/cm to about $1\times10^{-3}$ S/cm, about $5\times10^{-6}$ S/cm to about $5\times10^{-4}$ S/cm, about $1\times10^{-5}$ S/cm to about $1\times10^{-4}$ S/cm. Since the solid electrolyte according to an embodiment has such a high ionic conductivity, a lithium-air battery including such a solid electrolyte may have further reduced internal resistance.

The solid electrolyte according to an embodiment may be in the form of a particle. For example, the solid electrolyte may comprise a plurality of particles having an average particle diameter of about 5 nanometers (nm) to about 500 micrometers (μm), for example, about 100 nm to about 15 μm, for example, about 300 nm to about 10 μm, and a specific surface area of about 0.01 square meters per gram ($m^2/g$) to about 1000 $m^2/g$, for example, about 0.1 $m^2/g$ to about 500 $m^2/g$, or about 0.5 $m^2/g$ to about 100 $m^2/g$. Specific surface area can be determined using nitrogen isotherms. See, for example, E. P. Barrett, L. G. Joyner, P. P. Halenda, The determination of pore volume and area distributions in porous substances. I. Computations from nitrogen isotherms, J. Am. Chem. Soc. (1951), 73, 373-380, the content of which is incorporated herein by reference in its entirety.

Hereinafter, a method of preparing the solid electrolyte according to an embodiment will be further described.

A lithium precursor, an M1 precursor, an X precursor, a phosphorous precursor, and optionally an M2 precursor may be contacted, e.g., mixed together, to obtain a precursor mixture. In the preparing of the precursor mixture, a M2 precursor may be further added. M1 of the M1 precursor, X of the X precursor, and M2 of the M2 precursor may be as defined as recited in Formula 1.

A solvent may be added to the precursor mixture, as desired. The solvent may be any suitable solvent, e.g., a solvent capable of dissolving or dispersing the lithium precursor, the M1 precursor, the X precursor, the phosphorous precursor, and optionally the M2 precursor. The solvent may be, for example, ethanol, water, ethylene glycol, isopropanol, or a combination thereof. Also, a precursor comprising a plurality of M1, X, phosphorous, and optionally M2 may be used.

The mixing may be performed using a method known in the art, for example, milling, blending, or sputtering. The milling may be performed using a ball mill, an air-jet mill, a bead mill, or a roll mill.

Subsequently, the precursor mixture may be subjected to a first thermal treatment.

In the first thermal treatment of the precursor mixture, the temperature increase rate may be about 1 degree Celsius per minute (° C./min) to about 10° C./min, and the first thermal treatment temperature may be in a range of about 400° C. to about 950° C., for example, in a range of about 700° C. to about 900° C. When the temperature increase rate in the first thermal treatment is within this range, the first thermal treatment may be sufficient enough to attain the solid electrolyte according to an embodiment. A second thermal treatment may be used, which will be further described later.

The first thermal treatment may be performed under an oxidizing gas atmosphere. The oxidizing gas atmosphere may be created with, for example, air or oxygen. The first thermal treatment time may vary depending on the first thermal treatment temperature or the like. The first thermal treatment time may be, for example, in a range of about 1 hour to about 20 hours, for example, in a range of about 2 hour to about 12 hours, or for example, in a range of about 5 hours to about 12 hours.

The M1 precursor and the M2 precursor may each independently be an M1- or M2-containing compound, e.g., an M1- or M2-containing oxide, an M1- or M2-containing carbonate, an M1- or M2-containing chloride, an M1- or M2-containing phosphate, an M1- or M2-containing hydroxide, an M1- or M2-containing nitrate, or a combination thereof. For example, the M1 precursor and the M2 precursor may each independently be hafnium oxide, zirconium oxide, titanium oxide, yttrium oxide, hafnium nitrate, hafnium sulfate, zirconium nitrate, zirconium sulfate, or a combination thereof.

The X precursor may be, for example, lithium chloride, lithium fluoride, lithium bromide, or a combination thereof. The lithium precursor may be, for example, lithium oxide, lithium carbonate, lithium chloride, lithium sulfide, lithium nitrate, lithium phosphate, lithium hydroxide, or a combination thereof.

The phosphorous precursor may be, for example, $(NH_4)_2HPO_4$, $(NH_4)H_2PO_4$, $Na_2HPO_4$, $Na_3PO_4$, or a combination thereof.

The amount of the lithium precursor, the M1 precursor, the M2 precursor, the X precursor, and the phosphorous precursor may be stoichiometrically controlled to attain the compound represented by Formula 1.

Next, a product from the first thermal treatment may be pulverized to obtain a pulverized product. The pulverized product may be, for example, in the form of a powder comprising a plurality of particles. The pulverized product (particles) obtained by pulverizing may have a size of about 10 μm or less. When the pulverized particles have a size within this range, the particles may be small enough to be sufficiently pulverized and mixed, and may also facilitate formation of a NASICON structure, e.g., a compound having a structure that is isostructural with NASICON. As used herein, the term "size" may refer to an average particle diameter when the particles are spherical or may refer to a length of the major axis when the particles are non-spherical. The sizes of the particles may be measured using an electron scanning microscope or a particle size analyzer, e.g., by light scattering.

Next, a second thermal treatment may be performed on the pulverized product. In the second thermal treatment of the pulverized product, the temperature increase rate may be about 1° C./min to about 10° C./min. The second thermal treatment temperature may be in a range of about 500° C. to about 1300° C., for example, in a range of about 800° C. to about 1200° C.

In an embodiment, the second thermal treatment temperature may be greater than the first thermal treatment temperature. Before the second thermal treatment on the pulverized product, the pulverized product may be pressed into a pellet. When the second thermal treatment is performed on the pulverized product in pellet form, it may become easier to obtain the target solid electrolyte due to a reduced diffusion distance in the material to be thermally treated. When the second thermal treatment is performed on the pulverized product in the form of particles, a longer thermal treatment time and a greater thermal treatment temperature may be used, e.g., to accommodate a longer diffusion distance as compared to when the second thermal treatment is performed on the pulverized product in pellet form.

The conditions of the second thermal treatment may be determined according to the valence or oxidation number of M1 and M2. For example, the second thermal treatment may be performed, for example, under an oxidizing gas atmosphere, a reducing gas atmosphere, or an inert gas atmosphere. The oxidizing gas atmosphere may be created with, for example, air or oxygen. The reducing gas atmosphere may be created with a reducing gas such as hydrogen. The inert gas atmosphere may be created with an inert gas such as nitrogen, argon, or helium.

The second thermal treatment time may vary depending on the second thermal treatment temperature. The second thermal treatment time may be, for example, in a range of about 1 hour to about 50 hours, or for example, in a range of about 4 hours to 48 hours.

Through the second thermal treatment, the compound of Formula 1 may be obtained. When the temperature increase rates in the first thermal treatment and the second thermal treatment are within the disclosed ranges, the thermal treatment may be sufficient to form a desired crystal structure, and may also be economical due to a reduced synthesis time.

In an embodiment, the solid electrolyte may be used as an electrolyte of, for example, a metal-air battery, for example, a lithium-air battery. The solid electrolyte may be used as an electrolyte of an all-solid battery or an electrolyte of a lithium battery. The solid electrolyte may be used to prepare a cathode and an anode of a battery. The solid electrolyte may be used in coating the surface of a cathode and an anode.

According to another aspect of the disclosure, there is provided an electrochemical device including the solid electrolyte. By inclusion of the solid electrolyte, which may be chemically stable and may conduct ions and electrons at the same time, stability against moisture and a strong base may be improved, and thus deterioration of the electrochemical device may be efficiently inhibited.

In an embodiment, the electrochemical device may be, for example, a battery, an accumulator, a supercapacitor, a fuel cell, a sensor, an electrochromic device, or a combination thereof. However, the disclosed embodiments are not limited thereto. Any suitable device available as an electrochemical device in the art may be used.

The battery may be, for example, a primary battery or a secondary battery. The battery may be, for example, a lithium battery, a sodium battery, or the like. However, the disclosed embodiment is not limited thereto. The lithium battery may be, for example, a lithium-ion battery or a lithium-air battery. However, the disclosed embodiment is not limited thereto. The electrochromic device may be an electrochemical mirror, a window, or a screen. However, the disclosed embodiment is not limited thereto.

The electrochemical device may be, for example, a lithium metal battery, or a lithium-air battery. The battery comprises a cathode, and an anode, and an electrolyte therebetween.

The cathode may be porous. Since the cathode is porous, diffusion of air or oxygen into the cathode may be facilitated.

According to another aspect of the disclosure, a lithium-air battery may include the cathode according to the disclosed embodiment, an anode, and the solid electrolyte according to the disclosed embodiment, the solid electrolyte being interposed between the cathode and the anode.

At least one of the anode and the cathode may contain the solid electrolyte according to an embodiment. The anode may include lithium.

Since the lithium-air battery uses a solid electrolyte as described above, the lithium-air battery may have improved stability against moisture and a strong base, and reversibility thereof is ensured under humidified or air conditions, allowing the battery to operate smoothly. The lithium-air battery may have improved structural stability and deterioration thereof may be suppressed.

In an embodiment, the lithium-air battery may include the cathode according the embodiment. The cathode may be arranged, for example, on a cathode current collector.

In an embodiment, the cathode may include the solid electrolyte according to the disclosed embodiment. An amount of the solid electrolyte may be in a range of about 2 part to about 70 parts by weight, for example, 3 parts to 70 parts by weight, for example, 3 parts to about 60 parts by weight, for example, about 10 parts to about 60 parts by weight, each with respect to 100 parts by weight of the cathode.

In manufacturing the cathode, a pore may be introduced into the cathode using a pore-forming agent. The cathode may be in the form of a porous pellet, a porous sheet, or the like. However, the cathode is not limited thereto. The cathode may have any suitable form depending on a shape of the battery.

For example, the cathode may be pervious to a gas, such as oxygen or air. Accordingly, the cathode is distinguished from a cathode which is substantially impervious to a gas such as oxygen or air, e.g., a cathode that conducts only ions. The cathode may be porous and/or pervious to a gas, and thus oxygen or air may be easily diffused into the cathode. In addition, lithium ions and/or electrons may also easily migrate through the solid electrolyte included in the cathode. Accordingly, electrochemical reactions involving oxygen, lithium ions, and electrons may be facilitated in the cathode.

In an embodiment, in manufacturing the cathode, a conductive material may be further added, in addition to the solid electrolyte, to further improve electronic conductivity and ionic conductivity. For example, the conductive material may be porous. Due to the porosity of the conductive material, air permeation may be facilitated. The conductive material may be any material having porosity and/or conductivity available in the art. For example, the conductive material may be a carbonaceous material having porosity. The carbonaceous material may be, for example, carbon black, graphite, graphene, activated carbon, carbon fiber, or a combination thereof. However, embodiments are not limited thereto. Any suitable carbonaceous material available in the art may be used. The conductive material may be, for example, a metallic material. For example, the metallic material may be a metal fiber, metal mesh, metal powder, or a combination thereof. The metal powder may comprise, for example, copper, silver, nickel, or aluminum in a powder form. The conductive material may be, for example, an organic conductive material. The organic conductive material may be, for example, a polyphenylene derivative, a polythiophene derivative, or a combination thereof. For example, the conductive material may be used alone or in a combination thereof. The cathode may include a composite conductor as the conductive material. The cathode may further include any suitable conductive material, in addition to the composite conductor.

In an embodiment, the cathode may further include a catalyst for oxidation/reduction of oxygen. Examples of the catalyst may include: a metal-based catalysts such as a catalyst comprising platinum, gold, silver, palladium, ruthenium, rhodium, osmium, or a combination thereof; an oxide-based catalyst such as manganese oxide, iron oxide, cobalt oxide, nickel oxide, or a combination thereof; an organic metal-based catalyst such as cobalt phthalocyanine. A combination comprising at least one of the foregoing may be used. However, embodiments are not limited thereto. Any suitable catalyst for oxidation/reduction of oxygen used in the art may be used.

In an embodiment, the catalyst may be disposed on a catalyst support. The catalyst support may be an oxide support, a zeolite support, a clay-based mineral support, a carbon support, or a combination thereof. The oxide support may be a metal oxide support including aluminum (Al), silicon (Si), zirconium (Zr), titanium (Ti), cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), tungsten (W), or a combination thereof. Examples of the oxide support may include alumina, silica, zirconium oxide, titanium dioxide, or a combination thereof. Examples of the carbon support may include: a carbon black such as Ketjen black, acetylene black, channel black, lamp black, or a combination thereof; a graphite such as natural graphite, artificial graphite, expandable graphite, or a combination thereof; an activated carbon; or a carbon fiber. A combination comprising at least one of the foregoing may be used. However, embodiments are not limited thereto. Any suitable catalyst support available in the art may be used.

In an embodiment, the cathode may further include a binder. For example, the binder may include a thermoplastic resin or a thermocurable resin. For example, the binder may comprise polyethylene, polypropylene, polytetrafluoroethylene (PTFE), polyvinylidene fluoride (PVdF), styrene-butadiene rubber, a tetrafluoroethylene-perfluoroalkyl vinyl ether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethyl vinyl ether-tetrafluoroethylene copolymer, or an ethylene-acrylic acid copolymer, which may be used alone or in a combination thereof. However, embodiments are not limited thereto. Any suitable binder available in the art may be used.

In an embodiment, the cathode may be manufactured by mixing a conductive material, a catalyst for oxidation/reduction of oxygen, and a binder together and adding an appropriate solvent thereto to prepare a cathode slurry, and coating the cathode slurry on a surface of a substrate and drying a coated resultant, or optionally compression-molding a dried product to improve an electrode density. For example, the substrate may be a cathode current collector, a separator, or a solid electrolyte membrane. For example, the cathode current collector may be a gas diffusion layer. The conductive material may be, for example, a composite conductor.

For example, the catalyst for oxidation/reduction of oxygen and the binder may be omitted according to a type of the cathode.

In an embodiment, the lithium-air battery may include an anode. The anode may include the solid electrolyte.

The anode may include lithium.

The anode may be, for example, a lithium metal thin film or a lithium-based alloy thin film. The lithium-based alloy may be, for example, a lithium alloy comprising, for example, aluminum, tin, magnesium, indium, calcium, titanium, vanadium, or a combination thereof.

The lithium-air battery according to an embodiment may include an electrolyte between the cathode and the anode, as described above.

For example, the electrolyte may be a solid electrolyte including the compound represented by Formula 1.

For example, the electrolyte may further include, in addition to the solid electrolyte, a second solid electrolyte, a gel electrolyte, a liquid electrolyte, or a combination thereof. The second solid electrolyte, the gel electrolyte, and the liquid electrolyte are not specifically limited. Any suitable electrolyte available in the art may be used.

In an embodiments, the second solid electrolyte may include a solid electrolyte including an ionically conducting inorganic material, a solid electrolyte including a polymeric ionic liquid (PIL) and a lithium salt, a solid electrolyte including an ionically conducting polymer and a lithium salt, a solid electrolyte including an electronically conducting polymer, or a combination thereof. However, the disclosed embodiment is not limited thereto. Any suitable solid electrolyte available in the art may be used.

For example, the ionic conducting inorganic material may include a glass or amorphous metal ion conductor, a ceramic active metal ion conductor, a glass ceramic active metal ion conductor, or a combination thereof. However, embodiments are not limited thereto. Any ionically conducting inorganic material available in the art may be used. For example, the ionically conducting inorganic material may be ionically conducting inorganic particles or a pulverized product thereof, for example, in sheet form.

For example, the ionically conducting inorganic material may be $BaTiO_3$, $Pb(Zr_{1-a}Ti_a)O_3$ (PZT) wherein $0 \leq a \leq 1$, $Pb_{1-x}La_xZr_{1-y}Ti_yO_3$ (PLZT) wherein $0 \leq x < 1$ and $0 \leq y < 1$, $Pb(Mg_{1/3}Nb_{2/3})O_3$—$PbTiO_3$ (PMN-PT), $HfO_2$, $SrTiO_3$, $SnO_2$, $CeO_2$, $Na_2$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate ($Li_3PO_4$), lithium titanium phosphate ($Li_xTi_y(PO_4)_3$ wherein $0 < x < 2$ and $0 < y < 3$), lithium aluminum titanium phosphate ($Li_xAl_yTi_z(PO_4)_3$ wherein $0 < x < 2$, $0 < y < 1$, and $0 < z < 3$), $Li_{1+x+y}(Al_aGa_{1-a})_x(Ti_bGe_{1-b})_{2-x}Si_yP_{3-y}O_{12}$ wherein $0 \leq x \leq 1$, $0 \leq y \leq 1$, $0 \leq a \leq 1$, and $0 \leq b \leq 1$, lithium lanthanum titanate ($Li_xLa_yTiO_3$ wherein $0 < x < 2$, and $0 < y < 3$), lithium germanium thiophosphate ($Li_xGe_yP_zS_w$ wherein $0 < x < 4$, $0 < y < 1$, $0 < z < 1$, and $0 < w < 5$), lithium nitride ($Li_xN_y$ wherein $0 < x < 4$, and $0 < y < 2$), $SiS_2$-based glass ($Li_xSi_yS_z$ wherein $0 < x < 3$, $0 < y < 2$, and $0 < z < 4$), $P_2S_5$-based glass ($Li_xP_yS$ wherein $0 < x < 3$, $0 < y < 3$, and $0 < z < 7$), a $Li_2O$-based, LiF-based, LiOH-based, $Li_2CO_3$-based, $LiAlO_2$-based, or $Li_2O$—$Al_2O_3$—$SiO_2$—$P_2O_5$—$TiO_2$—$GeO_2$-based ceramics, a garnet-based ceramics ($Li_{3+x}La_3M_2O_{12}$ wherein M=Te, Nb, or Zr, $0 \leq x \leq 5$), or a combination thereof.

For example, the polymeric ionic liquid (PIL) may include: i) a cation of an ammonium-based cation, a pyrrolidinium-based cation, a pyridinium-based cation, a pyrimidinium-based cation, an imidazolium-based cation, a piperidinum-based cation, a pyrazolium-based cation, an oxazolium-based cation, a pyridazinium-based cation, a phosphonium-based cation, a sulfonium-based cation, a triazolium-based cation, or a combination thereof; and ii) an anion selected from $BF_4^-$, $PF_6^-$, $AsF_6^-$, $SbF_6^-$, $AlCl_4^-$, $HSO_4^-$, $ClO_4^-$, $CH_3SO_3$—, $CF_3CO_2^-$, $(CF_3SO_2)_2N^-$, $Cl^-$, $Br^-$, $I^-$, $SO_4^-$, $CF_3SO_3^-$, $(C_2F_5SO_2)(CF_3SO_2)N^-$, $NO_3^-$, $Al_2Cl_7^-$, $CH_3COO^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2)_2PO^-$, or a combination thereof. For example, the polymeric ionic liquid (PIL) may be poly(diallyldimethylammonium) bis(trifluoromethanesulfonyl)imide (TFSI), poly(1-allyl-3-methylimidazolium bis(trifluoromethanesulfonyl)imide), poly(N-methyl-N-propylpiperidinium bis(trifluoromethanesulfonyl) imide), or a combination thereof.

The ionically conducting polymer may include at least one ion conductive repeating unit. Examples are derived from an ether-based monomer, an acryl-based monomer, a methacryl-based monomer, a siloxane-based monomer, or a combination thereof.

The ionically conducting polymer may include, for example, polyethylene oxide (PEO), polyvinyl alcohol (PVA), polyvinyl pyrrolidone (PVP), polyvinyl sulfone, polypropylene oxide (PPO), polymethylmethacrylate, polyethylmethacrylate, polydimethylsiloxane, polyacrylic acid, polymethacrylic acid, poly(methyl acrylate), poly(ethyl acrylate), poly(2-ethylhexyl acrylate), poly(butyl methacrylate), poly(2-ethylhexyl methacrylate), poly(decyl acrylate), polyethylene vinyl acetate, a phosphate ester polymer, polyester sulfide, polyvinylidene fluoride (PVdF), a Li-substituted Nafion, or a combination thereof. However, the disclosed embodiment is not limited thereto. Any suitable ionically conducting polymer available in the art may be used.

The electronically conducting polymer may be, for example, a polyphenylene derivative or a polythiophene derivative. However, the disclosed embodiment is not limited thereto. Any suitable electronically conducting polymer available in the art may be used.

In an embodiment, the gel electrolyte may be obtained, for example, by adding a low-molecular-weight solvent to a solid electrolyte interposed between the cathode and the anode. The gel electrolyte may be a gel electrolyte obtained by further adding a low-molecular-weight organic compound such as a solvent or an oligomer to a polymer. The gel electrolyte may be a gel electrolyte obtained by further adding a low-molecular weight organic compound, such as a solvent or an oligomer, to any suitable polymer electrolyte.

In an embodiment, the liquid electrolyte may include a solvent and a lithium salt.

The solvent may include an organic solvent, an ionic liquid (IL), an oligomer, or a combination thereof. However, the disclosed embodiment is not limited thereto. Any suitable solvent available in the art that is in liquid form at room temperature (25° C.) may be used.

The organic solvent may include, for example, an ether-based solvent, a carbonate-based solvent, an ester-based solvent, a ketone-based solvent, or a combination thereof. For example, the organic solvent may include propylene carbonate, ethylene carbonate, fluoroethylene carbonate, vinylethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, dimethyl acetamide, dimethylsulfoxide, dioxane, 1,2-dimethoxyethane, sulfolane, dichloroethane, chlorobenzene, nitrobenzene, succinonitrile, diethylene glycol dimethyl ether (DEGDME), tetraethylene glycol dimethyl ether (TEGDME), polyethylene glycol dimethyl ether (PEGDME, Mn=~500), dimethyl ether, diethyl ether, dibutyl ether, dimethoxyethane, or a combination thereof. However, the disclosed embodiment is not limited thereto. The organic solvent may be any suitable organic solvent available in the art that is in liquid form at room temperature.

The ionic liquid (IL) may include, for example, i) an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazolium-based cation, or a combination thereof, and ii) an anion such as $BF_4^-$, $PF_6^-$, $AsF_6^-$, $SbF_6^-$, $AlCl_4^-$, $HSO_4^-$, $ClO_4^-$, $CH_3SO_3$—, $CF_3CO_2^-$, $(CF_3SO_2)_2N^-$, $Cl^-$, $Br^-$, $I^-$, $SO_4^-$, $CF_3SO_3^-$, $(C_2F_5SO_2)(CF_3SO_2)N$—, $NO_3^-$, $Al_2Cl_7^-$, $CH_3COO^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2)_2PO^-$, or a combination thereof.

The lithium salt may include lithium bis(trifluoromethanesulfonyl)imide ($LiN(SO_2CF_3)_2$, LiTFSI), $LiPF_6$, $LiBF_4$, $LiAsF_6$, $LiClO_4$, $LiNO_3$, (lithium bis(oxalato) borate (LiBOB), $LiCF_3SO_3$, $LiN(SO_2C_2F_5)_2$, $LiN(SO_2F)_2$, $LiC(SO_2CF_3)_3$, $LiN(SO_3CF_3)_2$, $LiC_4F_9SO_3$, $LiAlCl_4$, $CF_3SO_3Li$, or a combination thereof. However, the disclosed embodiment is not limited thereto. Any suitable material available in the art as a lithium salt may be used. A concentration of the lithium salt may be, for example, about 0.01 M to about 5.0M.

In an embodiment, the lithium-air battery may further include a separator between the cathode and the anode. Any suitable separator may be used, e.g., a separator having suitable durability under operation conditions of the lithium-air battery. For example, the separator may include a polymer non-woven fabric, for example, a non-woven fabric of polypropylene material or a non-woven fabric of polyphenylene sulfide; a porous film of an olefin resin such as polyethylene or polypropylene; or glass fiber. The separators may be used in a combination of at least two thereof.

For example, the electrolyte may have a structure in which a solid polymer electrolyte is impregnated in the separator, or a structure in which a liquid electrolyte is impregnated in the separator. For example, the electrolyte in which a solid polymer electrolyte is impregnated in the separator may be prepared by arranging solid polymer electrolyte films on opposite surfaces of the separator, and roll-pressing them at the same time. For example, when the electrolyte comprises a liquid electrolyte that is impregnated in the separator, it may be prepared by injecting a liquid electrolyte including a lithium salt into the separator.

In an embodiment, the lithium-air battery may be manufactured by installing the anode on an inner side of a case, sequentially arranging the electrolyte on the anode, the cathode on the electrolyte, and a porous cathode current collector on the cathode, and then arranging a pressing member on the porous cathode current collector to press a resulting cell structure with the pressing member so as to allow air to be transferred to the air electrode (i.e., the cathode). The case may be divided into upper and lower portions which contact the anode and the air electrode, respectively. An insulating resin may be disposed between the upper and lower portions of the case to electrically insulate the cathode and the anode from one another.

The lithium-air battery may be used as a lithium primary battery or as a lithium secondary battery. The lithium-air battery may have any suitable shape, for example, a coin, a button, a sheet, a stack, a cylinder, a plane, or a horn shape. However, the disclosed embodiment is not limited thereto. The lithium-air battery may be used in a large battery for an electric vehicle.

Figure 5:
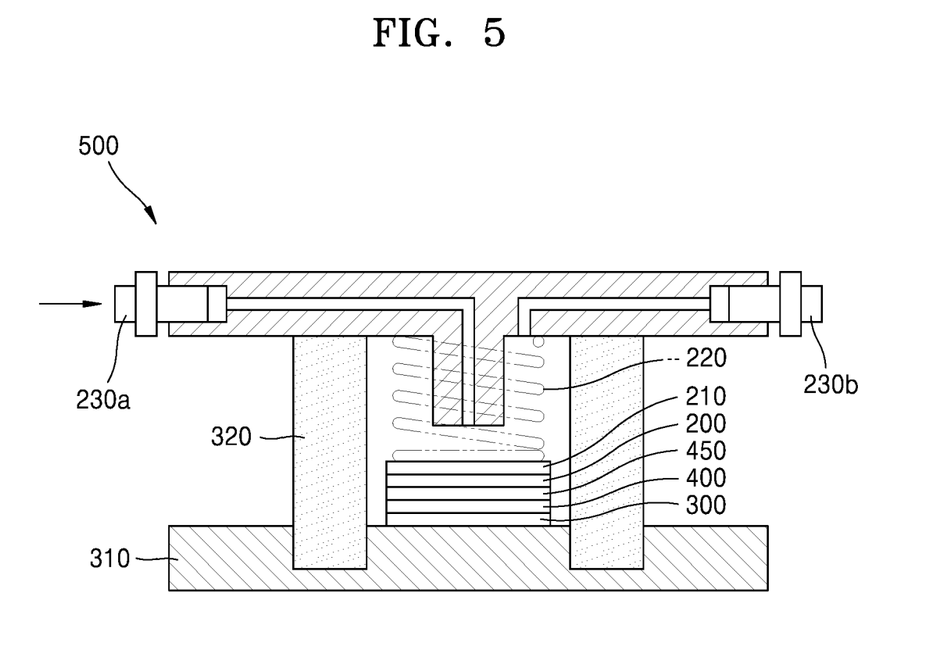
FIG. 5 is a schematic view of an embodiment of a lithium-air battery.

FIG. 5 is a schematic view illustrating a structure of a lithium-air battery 500 according to an embodiment.

Referring to FIG. 5, the lithium-air battery 500 according to an embodiment may include a cathode 200 adjacent to a first current collector 210 and using oxygen as an active material, an anode 300 adjacent to a second current collector 310 and including lithium, and an first electrolyte 400 interposed between the cathode 200 and the anode 300. The first electrolyte 400 may be a separator impregnated with a liquid electrolyte.

A second electrolyte 450 may be arranged between the cathode 200 and the first electrolyte 400. The second electrolyte 450, which is a lithium-ion conductive solid electrolyte membrane, may be the solid electrolyte according to the disclosed embodiment. The first current collector 210 may be porous and function as a gas diffusion layer which allows diffusion of air. A pressing member 220 for transporting air to the cathode 200 may be arranged on the first current collector 210.

A case 320 made of an insulating resin may be disposed shown in FIG. 5. The air may be supplied into the lithium-air battery 500 through an air inlet 230$a$ and may be discharged through an air outlet 230$b$. The lithium-air battery 500 may be accommodated in a stainless steel container.

The term "air" used herein is not limited to atmospheric air, and for convenience, may refer to a combination of gases including oxygen, or pure oxygen gas. This broad definition of the term "air" also applies to any other terms used herein, including "air battery" and "air electrode."

An embodiment of the disclosure will now be described in further detail with reference to the following examples. However, these examples are only for illustrative purposes and are not intended to limit the scope of the disclosed embodiment.

EXAMPLES

Formation of Solid Electrolyte

Comparative Example 1: $LiHf_2P_3O_{12}$ $Li_2CO_3$ as a lithium precursor, $HfO_2$ as an M1 precursor, and $(NH_4)_2HPO_4$ as a phosphorous precursor were mixed in a stoichiometric ratio according to a composition ratio of $LiHf_2P_3O_{12}$, and then ethanol was added thereto and mixed to obtain a precursor mixture. The precursor mixture was put into a ball mill, and then pulverized and mixed for about 4 hours. The resulting mixture was dried, heated at a rate of about 5° C./min to about 900° C., and then subjected to first thermal treatment under an air atmosphere for about 12 hours.

The powder obtained through the first thermal treatment was pulverized, and then pressed to form pellets having a diameter of about 1.3 cm and a height of about 0.5 cm. The pellets were subjected to second thermal treatment at about 1200° C. under an air atmosphere for about 4 hours to obtain a target product. For the second thermal treatment, the temperature was increased to 1200° C. at a temperature increase rate of about 5° C./min.

Example 1: $Li_{0.8}Hf_2P_3O_{11.8}F_{0.2}$

A solid electrolyte was prepared in the same manner as in Comparative Example 1, except that lithium fluoride (LiF) was further added in preparing a precursor mixture, the amount of lithium fluoride was stoichiometrically controlled so as to obtain $Li_{0.8}Hf_2P_3O_{11}.F_{0.2}$, the first thermal treatment was performed at about 800° C., and the second thermal treatment was performed at about 1200° C.

Example 2: $Li_{0.8}Hf_2P_3O_{11.8}Cl_{0.2}$

A solid electrolyte was prepared in the same manner as in Comparative Example 1, except that lithium chloride (LiCl) was further added in preparing a precursor mixture, the amount of lithium chloride was stoichiometrically controlled so as to obtain $Li_{0.8}Hf_2P_3O_{11.8}Cl_{0.2}$, the first thermal treatment was performed at about 800° C., and the second thermal treatment was performed at about 1250° C.

Example 3: $LiHf_{1.9}Y_{0.1}P_3O_{11.9}F_{0.1}$

A solid electrolyte was prepared in the same manner as in Comparative Example 1, except that lithium fluoride (LiF) and yttrium oxide ($Y_2O_3$) were further added in preparing a precursor mixture, the amounts of lithium fluoride and yttrium oxide were stoichiometrically controlled so as to obtain $LiHf_{1.9}Y_{0.1}P_3O_{11.9}F_{0.1}$, the first thermal treatment was performed at about 850° C., and the second thermal treatment was performed at about 1300° C.

Example 4: $LiHf_{1.9}Y_{0.1}P_3O_{11.9}Cl_{0.1}$

A solid electrolyte was prepared in the same manner as in Comparative Example 1, except that lithium chloride (LiCl) and yttrium oxide ($Y_2O_3$) were further added in preparing a precursor mixture, the amounts of lithium chloride and yttrium oxide were stoichiometrically controlled so as to obtain $LiHf_{1.9}Y_{0.1}P_3O_{11.9}Cl_{0.1}$, the first thermal treatment was performed at about 850° C., and the second thermal treatment was performed at about 1250° C.

Examples 5 and 6

Solid electrolytes having the compositions as in Table 1 were prepared in the same manner as in Example 1, except that, instead of hafnium oxide ($HfO_2$), zirconium oxide and titanium oxide were used, respectively, as a M1 precursor in preparing a precursor mixture, the amount of each precursor was stoichiometrically controlled so as to obtain a target product. The first thermal treatment and the second thermal treatment were performed at about 900° C. and about 1300° C., respectively, in Example 5. The first thermal treatment and the second thermal treatment were performed at about 900° C. and about 1250° C., respectively, in Example 6.

Example 7

A solid electrolyte was prepared in the same manner as in Comparative Example 1, except that lithium chloride (LiCl) and lithium fluoride (LiF) were further added in preparing a precursor mixture, the amounts of lithium chloride and lithium fluoride were stoichiometrically controlled so as to obtain the solid electrolyte having the composition as in Table 1, the first thermal treatment was performed at about 900° C., and the second thermal treatment was performed at about 1300° C.

TABLE 1

| Example | Composition |
| --- | --- |
| Example 5 | $Li_{0.8}Zr_2P_3O_{11.8}F_{0.2}$ |
| Example 6 | $Li_{0.8}Ti_2P_3O_{11.8}F_{0.2}$ |
| Example 7 | $Li_{0.8}Hf_2P_3O_{11.8}F_{0.1}Cl_{0.1}$ |

Manufacture Example 1

Manufacture of lithium-air battery After 40 parts by weight of carbon (Super-P), 10 parts by weight of polytetrafluoroethylene (PTFE), and 50 parts by weight of N-methylpyrrolidone (NMP) were mixed together to prepare a cathode slurry, the slurry was coated and roll-pressed to obtain a cathode mixed sheet. The cathode mixed sheet was pressed on a stainless steel mesh, and then vacuum-dried in a 100° C.-oven for about 120 minutes to obtain a cathode.

A polypropylene coated aluminum film (200 μm) having a size of about 5 cm×5 cm was punctured to form a hole of about 1 cm×1 cm at the center thereof. The hole was blocked with the solid electrolyte of Example 1 having a size of about 1.4 cm×1.4 cm to thereby form a first aluminum film including the solid electrolyte of Example 1 as part thereof. Next, a second aluminum film having a size of about 5 cm×5 cm, a copper current collector (having a thickness of about 20 μm), a lithium foil (having a size of about 1.4 cm×1.4 cm and a thickness of about 100 μm), a Celgard-3501 polypropylene separator (having a thickness of about 25 μm, available from Celgard) impregnated with an electrolyte solution which was a mixture of 1M lithium bis(trifluoromethanesulfonyl)imide (LiTFSI) and propylene carbonate (PC), and the first aluminum film prepared as above were stacked upon one another and then vacuum-heated to stick together to thereby obtain an aluminum pouch type, protected lithium anode.

The protected lithium anode was installed in a stainless steel case, and a cathode with a Celgard-3501 polypropylene separator (available from Celgard) having a thickness of about 25 μm was placed on a side opposite to the anode. Subsequently, after a porous gas diffusion layer formed of carbon fiber was arranged on the cathode, a foam nickel plate was arranged thereon and then pressed with a pressing member, to thereby manufacture a lithium-air battery.

Manufacture Examples 2-4: Manufacture of Lithium-Air Battery

Lithium-air batteries were manufactured in the same manner as in Manufacture Example 1, except that the solid electrolytes of Examples 2 to 4 were used, respectively, instead of the solid electrolyte of Example 1.

Comparative Manufacture Example 1: Manufacture of Lithium-Air Battery

A lithium-air battery was manufactured in the same manner as in Manufacture Example 1, except that the solid electrolyte of Comparative Example 1 was used, instead of the solid electrolyte of Example 1.

Evaluation Example 1: Evaluation by X-Ray Diffraction

Figure 1:
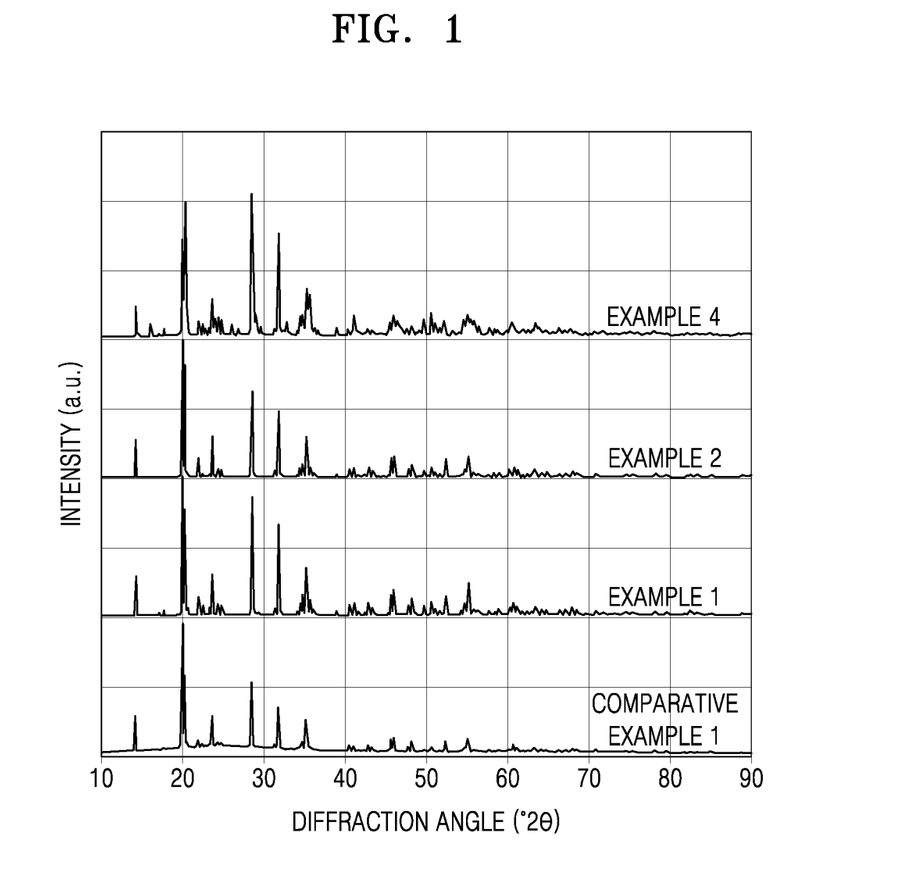
FIG. 1 is graph of intensity (arbitrary units, a.u.) versus diffraction angle (degrees 2θ) showing the results of X-ray diffraction analysis of solid electrolytes of Examples 1, 2 and 4 and Comparative Example 1.

X-ray diffraction (XRD) spectra of the solid electrolytes of Example 1, Example 2, Example 4, and Comparative Example 1 were evaluated. The results are shown in FIGS. 1 and 2. The XRD spectra were obtained with Cu Kα radiation using a Bruker D8 Advance diffractometer.

The analysis results of the XRD spectra are shown in FIGS. 1 and 2. FIG. 2 illustrates an enlarged view of portions at a diffraction angle (2θ) of about 20°2θ in the XRD spectra of FIG. 1.

As shown in FIG. 1, the solid electrolytes of Comparative Example 1 ($LiHf_2P_3O_{12}$), Example 1 ($Li_{0.8}Hf_2P_3O_{11.8}F_{0.2}$), Example 2 ($Li_{0.8}Hf_2P_3O_{11.8}Cl_{0.2}$), and Example 4 ($LiHf_{1.9}Y_{0.1}P_3O_{11.9}Cl_{0.1}$) all exhibited macroscopically very similar XRD patterns, and could be indexed as materials having a crystal structure isostructural with NASICON.

Referring to FIG. 2, the solid electrolytes of Example 1 and Example 2 were found to have a first diffraction peak and a second diffraction peak all shifted to the right by about 0.1°2θ, as compared with the solid electrolyte of Comparative Example 1. The solid electrolyte of Example 4 was found to have a first diffraction peak and a second diffraction peak A1 all shifted to the right by about 0.05°2θ, as compared to the solid electrolyte of Comparative Example 1. In particular, the solid electrolyte of Example 4 exhibited a second diffraction peak A2 at about 20.3°2θ.

In terms of peak intensity, while an intensity ratio (P2/P1) of the second diffraction peak (2θ=20.16°) to the first diffraction peak (2θ=19.92°) in the solid electrolyte of Comparative Example 1 was 0.58, an intensity ratio (P2/P1) of the second diffraction peak (2θ=20.16°) to the first diffraction peak (2θ=19.92°) in the solid electrolyte of Example 1 was 0.77, an intensity ratio (P2/P1) of the second diffraction peak (2θ=20.16°) to the first diffraction peak (2θ=19.92°) in the solid electrolyte of Example 2 was 0.81, and an intensity ratio (P2/P1) of the second diffraction peak (2θ=20.16°) to the first diffraction peak (2θ=19.92°) in the solid electrolyte of Example 4 was 1.26, In the solid electrolyte of Example 4, the second diffraction peak had a higher intensity than that of the first diffraction peak.

Evaluation Example 2: Evaluation of Ionic Conductivity

Electron-blocking cells were manufactured by arranging liquid electrolyte (1M LiTFSI in propylene carbonate (PC))-impregnated separator membranes on opposite surfaces of the pellets (hereinafter, "pellets A") prepared in Examples 1 to 4 and the pellets ("pellets B") prepared in Comparative Example 1, and then arranging lithium foil thereon. Then, ionic conductivities of the electron-blocking cells were measured using a DC polarization method.

While applying a constant voltage of about 100 mV to each of the completed symmetric cells for about 30 minutes, a time-dependent current of the cell was measured. An ionic resistance was calculated from the measured current, and an ionic conductivity was calculated from the ionic resistance.

After the pellets A or pellets B were immersed in a saturated lithium hydroxide aqueous solution at about 40° C. for about 6 days, the ionic conductivity of the pellets A and pellets B were evaluated in the same manner as that of the pellets A and pellets B before the impregnation. The results are shown in Table 2 and FIG. 3.

TABLE 2

| Example | Composition | Ionic conductivity before impregnation with LiOH solution (S/cm) | Ionic conductivity after impregnation with LiOH solution (S/cm) |
|---|---|---|---|
| Example 1 | $Li_{0.8}Hf_2P_3O_{11.8}F_{0.2}$ | $1.19 \times 10^{-5}$ | $3.72 \times 10^{-5}$ |
| Example 2 | $Li_{0.8}Hf_2P_3O_{11.8}Cl_{0.2}$ | $3.30 \times 10^{-5}$ | $5.17 \times 10^{-5}$ |
| Example 3 | $LiHf_{1.9}Y_{0.1}P_3O_{11.9}F_{0.1}$ | $1.79 \times 10^{-5}$ | $1.64 \times 10^{-5}$ |
| Example 4 | $LiHf_{1.9}Y_{0.1}P_3O_{11.9}Cl_{0.1}$ | $5.99 \times 10^{-6}$ | $1.49 \times 10^{-5}$ |
| Comparative Example 1 | $LiHf_2P_3O_{12}$ | $2.12 \times 10^{-5}$ | $1.32 \times 10^{-7}$ |

Figure 3:
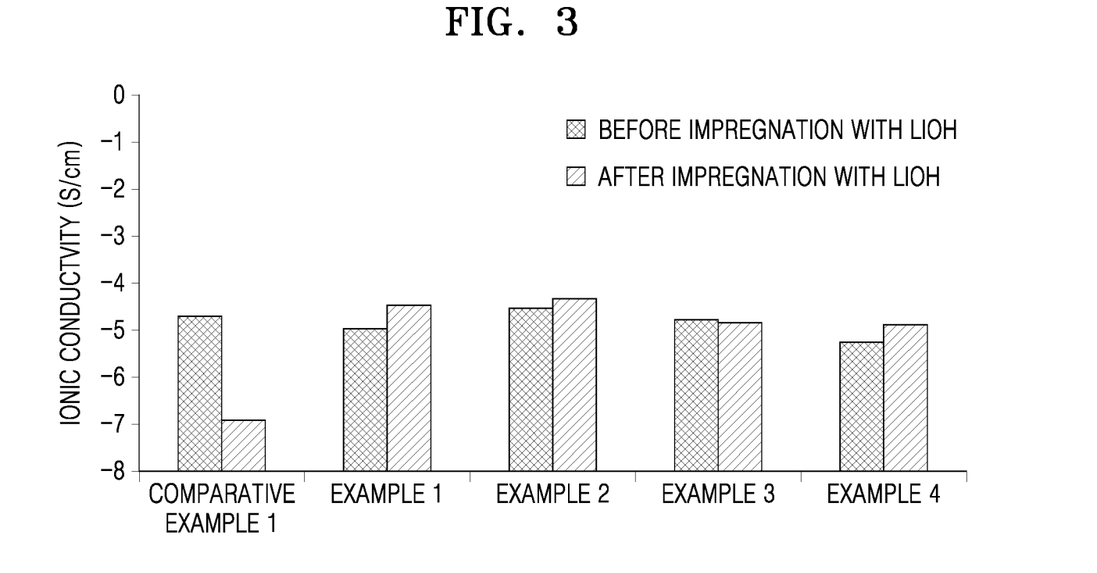
FIG. 3 is a graph of ionic conductivity (Siemens per centimeter, S/cm) before and after impregnation with lithium hydroxide of solid electrolytes of Examples 1 to 4 and Comparative Example 1.

Referring to Table 2 and FIG. 3, the solid electrolytes of Examples 1 to 4 were found to exhibit a greater ionic conductivity retention after the impregnation with the lithium hydroxide solution, as compared to the solid electrolyte of Comparative Example 1. From these results, it was found that due to the introduction of anions such as fluoride and chloride ions, and yttrium, the solid electrolytes of Examples 1 to 4 had remarkably improved stability against moisture and a strong base.

The ionic conductivity retention of the solid electrolytes of Example 3 and Comparative example 1 was evaluated. The results are shown in FIG. 4.

Figure 4:
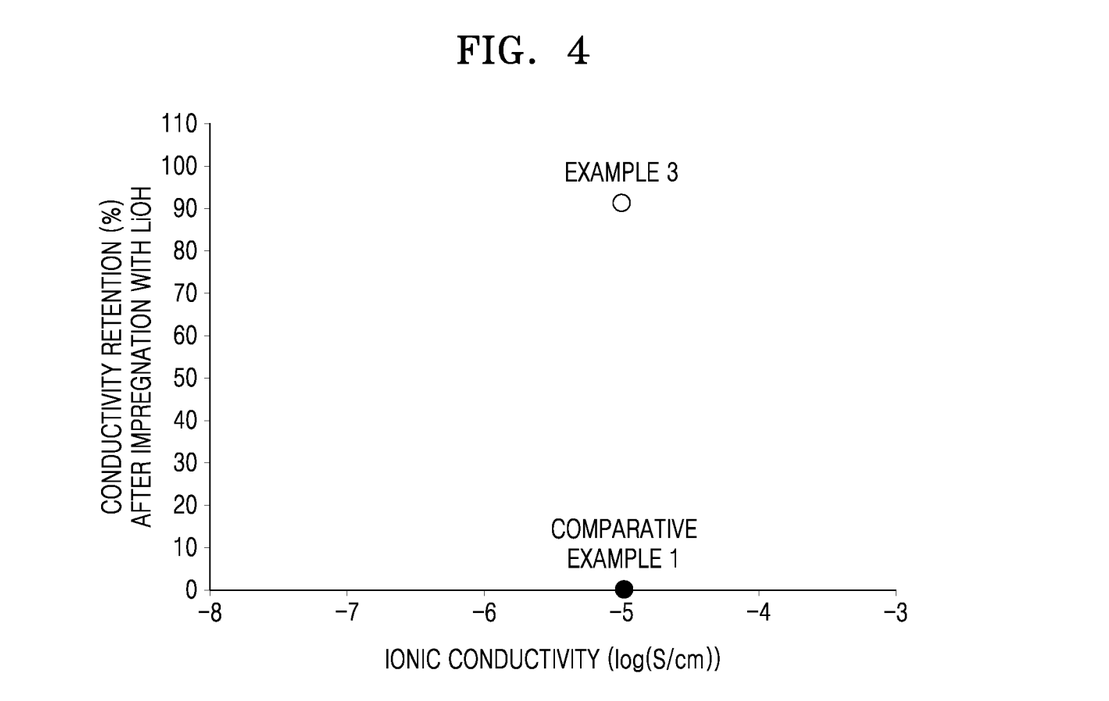
FIG. 4 is a graph of conductivity retention (percent after impregnation with lithium hydroxide) versus ionic conductivity (log(S/cm)) illustrating a change in ionic conductivity in the solid electrolytes of Example 3 and Comparative Example 1.

From the results in FIG. 4, it was found that the solid electrolyte of Example 3 was greatly improved ionic conductivity retention, as compared to that of the solid electrolyte of Comparative Example 1.

Evaluation Example 3: Evaluation of Electrochemical Stability

After the solid electrolyte of Example 1 was pulverized to a size of about 1 μm to obtain a pulverized compound, about 85 weight percent (wt %) of the pulverized compound, about 10 wt % of carbon black as a conducting agent, and about 5 wt % of polyvinylidene fluoride (PVDF) as a binder, based on a total weight of the solid electrolyte, the carbon black, and the binder, were mixed with N-methyl-2-pyrrolidone to prepare a slurry. The prepared slurry was coated on an aluminum foil and then dried to thereby manufacture a working electrode. A separator impregnated with a liquid electrolyte (1M LiTFSI in propylene carbonate (PC) was arranged between the working electrode and a lithium metal foil used as a counter electrode to thereby complete the manufacture of a half cell.

Each of the half cells was analyzed by cyclic voltammetry (CV) at a scan rate of about 0.1 millivolts per second (mV/sec) in a voltage range of about 2 volts (V) to about 4 V (with respect to Li) to evaluate electrochemical stability of the solid electrolyte.

As a result, the solid electrolyte of Example 1 was found to be electrochemically stable without an overcurrent caused by side reactions, during one scan, 80 scans, or 100 scans.

Evaluation Example 5: Evaluation of Charge-Discharge Characteristics of Lithium-Air Battery The lithium-air battery manufactured in Manufacture Example 1 was subjected to a charge-discharge cycle of discharging at about 60° C. under an oxygen atmosphere of about 1 atm with a constant current of about 0.01 mA/cm² until a voltage reached 2.0 V (with respect to Li) and then charging with the same constant current until a voltage reached 4.25 V. The results of the charge-discharge test at the 1$^{st}$ cycle of each lithium-air battery were evaluated.

As a result of the charge-discharge test, the lithium-air battery of Manufacture Example 1 using the solid electrolyte of Example 1 was found to stably operate. The lithium-air batteries of Manufacture Examples 2 to 4 manufactured using the solid electrolytes of Examples 2 to 4, respectively, were found to also stably operate like the lithium-air battery of Manufacture Example 1.

Charge and discharge characteristics of the lithium-air batteries of Manufacture Examples 2 to 4 were evaluated in the same manner as applied to the lithium-air battery of Manufacture Example 1.

As a result of the charge and discharge characteristics analysis, charge and discharge characteristics of the lithium-air batteries of Manufacture Examples 2 to 4 were found to be similar to those of the lithium-air battery of Manufacture Example 1.

As described above, according to the disclosed embodiment, a solid electrolyte may be stable against a strong base and moisture, and also may have excellent ionic conductivity even in contact with a strong base. By using such a solid electrolyte, an electrochemical device in which degradation is suppressed may be manufactured.

It should be understood that embodiments described herein should be considered in a descriptive sense only and not for purposes of limitation. Descriptions of features, aspects, or advantages within each embodiment should be considered as available for other similar features, aspects, or advantages in other embodiments. While an embodiment has been described with reference to the figures, it will be understood by those of ordinary skill in the art that various changes in form and details may be made therein without departing from the spirit and scope as defined by the following claims.

What is claimed is:

1. A solid electrolyte comprising:
   a compound represented by Formula 1

$Li_xM1_{2-y}M2_y(PO_{4-z}X_z)_3$  Formula 1 wherein, in Formula 1,
   M1 is a tetravalent element,
   M2 is aluminum, lanthanum, scandium, cerium, praseodymium, gadolinium, europium, or a combination thereof,
   X is a halogen atom, a pseudohalogen, or a combination thereof, and 0<x<8
   0≤y<1, and 0<z<4.

2. The solid electrolyte of claim 1, wherein M1 is hafnium, titanium, zirconium, or a combination thereof.

3. The solid electrolyte of claim 1, wherein M2 is lanthanum, scandium, cerium, praseodymium, gadolinium, europium, or a combination thereof.

4. The solid electrolyte of claim 1, wherein X is chlorine, bromine, fluorine, cyanide, cyanate, thiocyanate, azide, or a combination thereof.

5. The solid electrolyte of claim 1, wherein, in Formula 1, $X_{3z}$ is $F_n$, $Br_n$, $Cl_n$, $(F_aCl_{1-a})_n$, $(F_aBr_{1-a})_n$, or $(Cl_aBr_{1-a})_n$,
   n is 1 or less and
   a is about 0.01 to about 0.99.

6. The solid electrolyte of claim 1, wherein the solid electrolyte has a NASICON crystal structure or a crystal structure that is isostructural with the NASICON crystal structure.

7. The solid electrolyte of claim 1, wherein, in Formula 1, x is about 0.5 to about 1.5, y is 0 to about 0.8, and z is greater than 0 and less than or equal to about 1.

8. The solid electrolyte of claim 1, wherein the compound represented by Formula 1 is a compound represented by Formula 2, a compound represented by Formula 3, or a compound represented by Formula 4:

$$Li_{1+y-3z}Hf_{2-y}M2_y(PO_{4-z}X_z)_3 \qquad \text{Formula 2}$$

wherein, in Formula 2, M2 is aluminum, lanthanum, scandium, cerium, praseodymium, gadolinium, europium, or a combination thereof,
X is a halogen atom, a pseudohalogen, or a combination thereof,
$0 \le y < 1$, and $0 < z < 4$, or $$Li_{1+y-3z}Ti_{2-y}M2_y(PO_{4-z}X_z)_3 \qquad \text{Formula 3}$$

wherein, in Formula 3, M2 is aluminum, lanthanum, scandium, cerium, praseodymium, gadolinium, europium, a hexavalent element, or a combination thereof,
X is a halogen atom, a pseudohalogen, or a combination thereof,
$0 \le y < 1$, and $0 < z < 4$, or $$Li_{1+y-3z}Zr_{2-y}M2_y(PO_{4-z}X_z)_3 \qquad \text{Formula 4}$$

wherein, in Formula 4, M2 is aluminum, lanthanum, scandium, cerium, praseodymium, gadolinium, europium, or a combination thereof,
X is a halogen atom, a pseudohalogen, or a combination thereof,
$0 \le y < 1$, and $0 < z < 4$.

9. The solid electrolyte of claim 8, wherein, in Formulae 2 to 4, $1+y-3z$ is about 0.5 to about 1.5, y is 0 to about 0.8, and z is greater than 0 and equal to or less than 1.

10. The solid electrolyte of claim 1, wherein the compound represented by Formula 1 is $Li_{0.8}Hf_2P_3O_{11.8}F_{0.2}$, $Li_{0.8}Hf_2P_3O_{11.8}Cl_{0.2}$, $Li_{0.8}Hf_2P_3O_{11.8}Br_{0.2}$, $Li_{0.8}Hf_2P_3O_{11.8}Br_{0.1}F_{0.1}$, $Li_{0.8}Hf_2P_3O_{11.8}Br_{0.1}Cl_{0.1}$, $Li_{0.8}Ti_2P_3O_{11.8}F_{0.2}$, $Li_{0.8}Ti_2P_3O_{11.8}Cl_{0.2}$, $Li_{0.8}Ti_2P_3O_{11.8}Br_{0.2}$, $Li_{0.8}Ti_2P_3O_{11.8}Cl_{0.2}$, $LiHf_{1.9}Al_{0.1}P_3O_{11.9}F_{0.1}$, $LiHf_{1.9}Al_{0.1}P_3O_{11.9}Br_{0.1}$, $LiHf_{1.9}Al_{0.1}P_3O_{11.9}F_{0.05}Br_{0.05}$, $LiHf_{1.9}Al_{0.1}P_3O_{11.9}Cl_{0.1}$; $LiHf_{1.9}Al_{0.1}P_3O_{11.9}Cl_{0.05}Br_{0.05}$, $LiHf_{1.9}La_{0.1}P_3O_{11.9}F_{0.1}$, $LiHf_{1.9}La_{0.1}P_3O_{11.9}Br_{0.1}$, $LiHf_{1.9}La_{0.1}P_3O_{11.9}F_{0.05}Br_{0.05}$, $LiHf_{1.9}La_{0.1}P_3O_{11.9}Cl_{0.05}Br_{0.05}$, $LiHf_{1.9}La_{0.1}P_3O_{11.9}Cl_{0.1}$, $LiHf_{1.9}Gd_{0.1}P_3O_{11.9}F_{0.1}$, $LiHf_{1.9}Gd_{0.1}P_3O_{11.9}F_{0.05}Br_{0.05}$, $LiHf_{1.9}Gd_{0.1}P_3O_{11.9}Cl_{0.05}Br_{0.05}$, $LiHf_{1.9}Gd_{0.1}P_3O_{11.9}Cl_{0.1}$, $LiZr_{1.9}Al_{0.1}P_3O_{11.9}F_{0.1}$, $LiHf_{1.9}Al_{0.1}P_3O_{11.9}F_{0.05}Br_{0.05}$, $LiHf_{1.9}Al_{0.1}P_3O_{11.9}Cl_{0.05}Br_{0.05}$, $LiZr_{1.9}Al_{0.1}P_3O_{11.9}Cl_{0.1}$, $LiZr_{1.9}La_{0.1}P_3O_{11.9}F_{0.1}$, $LiZr_{1.9}La_{0.1}P_3O_{11.9}Br_{0.1}$, $LiZr_{1.9}La_{0.1}P_3O_{11.9}Br_{0.05}F_{0.05}$, $LiZr_{1.9}La_{0.1}P_3O_{11.9}Br_{0.05}Cl_{0.05}$, $LiZr_{1.9}La_{0.1}P_3O_{11.9}Cl_{0.1}$, $LiZr_{1.9}Gd_{0.1}P_3O_{11.9}F_{0.1}$, $LiZr_{1.9}Gd_{0.1}P_3O_{11.9}Br_{0.1}$, $LiZr_{1.9}Gd_{0.1}P_3O_{11.9}Br_{0.05}F_{0.05}$, $LiZr_{1.9}Gd_{0.1}P_3O_{11.9}Br_{0.05}Cl_{0.05}$, $LiZr_{1.9}Gd_{0.1}P_3O_{11.9}Cl_{0.1}$, $LiTi_{1.9}Al_{0.1}P_3O_{11.9}F_{0.1}$, $LiTi_{1.9}Gd_{0.1}P_3O_{11.9}Br_{0.1}$, $LiTi_{1.9}Gd_{0.1}P_3O_{11.9}Br_{0.05}F_{0.05}$, $LiTi_{1.9}Gd_{0.1}P_3O_{11.9}Br_{0.05}Cl_{0.05}$, $LiTi_{1.9}Al_{0.1}P_3O_{11.9}Cl_{0.1}$, $LiTi_{1.9}La_{0.1}P_3O_{11.9}F_{0.1}$, $LiTi_{1.9}La_{0.1}P_3O_{11.9}Cl_{0.1}$, $LiTi_{1.9}Gd_{0.1}P_3O_{11.9}F_{0.1}$, $LiTi_{1.9}Gd_{0.1}P_3O_{11.9}Br_{0.1}$, $LiTi_{1.9}Gd_{0.1}P_3O_{11.9}Br_{0.05}F_{0.05}$, $LiTi_{1.9}Gd_{0.1}P_3O_{11.9}Cl_{0.1}$, or a combination thereof.

11. The solid electrolyte of claim 1, wherein the solid electrolyte has an ionic conductivity of about $1 \times 10^{-5}$ Siemens per centimeter or greater after being impregnated with a saturated lithium hydroxide solution.

12. The solid electrolyte of claim 1, wherein an ionic conductivity retention of the solid electrolyte in a saturated lithium hydroxide solution is about 50% or greater.

13. The solid electrolyte of claim 1, wherein the solid electrolyte exhibits
   a first diffraction peak with a maximum point at about 19.93° 2θ to about 19.99° 2θ, and
   a second diffraction peak with a maximum point at a diffraction angle of about 20.17°2θ to about 20.25° 2θ,
   when analyzed by X-ray diffraction using CuKα radiation.

14. The solid electrolyte of claim 13, wherein an intensity ratio of the second diffraction peak to the first diffraction peak is less than about 1.

15. The solid electrolyte of claim 1, wherein the solid electrolyte exhibits
   a first diffraction peak with a maximum point at a diffraction angle of about 19.93° 2θ to about 19.99° 2θ, and
   a second diffraction peak having a doublet peak shape, and wherein the second diffraction peak includes a peak with a first maximum point at about 20.15° 2θ to about 20.25°2θ, and a peak with a maximum point at about 20.26° 2θ to about 20.32° 2θ,
   when analyzed by X-ray diffraction using CuKα radiation.

16. The solid electrolyte of claim 15, wherein an intensity ratio of the second diffraction peak with the first maximum point at about 20.15° 2θ to about 20.25° 2θ to the first diffraction peak is greater than about 1.

17. The solid electrolyte of claim 15, wherein an intensity ratio of the second diffraction peak with a maximum point of about 20.26° 2θ to about 20.32° 2θ to the first diffraction peak is greater than about 1.

18. The solid electrolyte of claim 1, wherein the solid electrolyte has an ionic conductivity at 25° C. of about $1 \times 10^{-6}$ Siemens per centimeter, or greater.

19. A lithium-air battery comprising:
   a cathode; an anode; and an electrolyte disposed between the cathode and the anode,
   the electrolyte comprising the solid electrolyte according to claim 1.

20. The lithium-air battery of claim 19, wherein at least one of the cathode and the anode comprises the solid electrolyte comprising the compound of Formula 1:

$$Li_xM1_{2-y}M2_y(PO_{4-z}X_z)_3 \qquad \text{Formula 1}$$

wherein, in Formula 1,
M1 is a tetravalent element,
M2 is aluminum, lanthanum, scandium, cerium, praseodymium, gadolinium, europium, or a combination thereof,
X is a halogen atom, a pseudohalogen, or a combination thereof,
$0 < x < 8$, $0 \le y < 1$, and $0 < z < 4$.

21. An electrochemical device comprising the solid electrolyte according to claim 1.

22. The electrochemical device of claim 21, comprising a battery, an accumulator, a supercapacitor, a fuel cell, a sensor, an electrochromic device, or a combination thereof.

23. A solid electrolyte comprising:
a compound represented by Formula 1

$$\text{Li}_x\text{M1}_{2-y}\text{M2}_y(\text{PO}_{4-z}\text{X}_z)_3 \qquad \text{Formula 1}$$

wherein, in Formula 1,
M1 is a tetravalent element,
M2 is aluminum, lanthanum, scandium, cerium, praseodymium, gadolinium, europium, or a combination thereof,
X is a halogen atom, and
$0<x<8$, $0\leq y<0.1$, and $0<z<0.2$.

* * * * *